(12) United States Patent
Gao

(10) Patent No.: US 7,313,823 B2
(45) Date of Patent: Dec. 25, 2007

(54) ANTI-ALTERNATION SYSTEM FOR WEB-CONTENT

(76) Inventor: Zhenyu Gao, 7531 Knott Ave., Apt. #24, Buena Park, CA (US) 90620

( * ) Notice: Subject to any disclaimer, the term of this patent is extended or adjusted under 35 U.S.C. 154(b) by 722 days.

(21) Appl. No.: 09/965,968

(22) Filed: Sep. 26, 2001

(65) Prior Publication Data
US 2002/0040432 A1    Apr. 4, 2002

(30) Foreign Application Priority Data
Sep. 29, 2000    (JP)    ............................ 2000-299305
May 30, 2001    (JP)    ............................ 2001-161754

(51) Int. Cl.
*G06F 17/30* (2006.01)
*G06F 15/16* (2006.01)
*H04N 7/16* (2006.01)

(52) U.S. Cl. .................... 726/26; 713/165; 713/185
(58) Field of Classification Search ................ 713/185, 713/165; 726/26
See application file for complete search history.

(56) References Cited

U.S. PATENT DOCUMENTS

| | | | | |
|---|---|---|---|---|
| 5,276,874 | A * | 1/1994 | Thomson ..................... | 707/102 |
| 5,537,585 | A * | 7/1996 | Blickenstaff et al. ........ | 707/205 |
| 5,812,398 | A * | 9/1998 | Nielsen .......................... | 705/1 |
| 6,351,811 | B1* | 2/2002 | Groshon et al. ............ | 713/176 |
| 6,363,357 | B1* | 3/2002 | Rosenberg et al. ........... | 705/26 |
| 6,721,890 | B1* | 4/2004 | Shrikhande ................... | 726/14 |
| 6,880,083 | B1* | 4/2005 | Korn ........................... | 713/170 |
| 2001/0044820 | A1* | 11/2001 | Scott .......................... | 709/202 |
| 2002/0023143 | A1* | 2/2002 | Stephenson et al. ........ | 709/218 |
| 2002/0033762 | A1* | 3/2002 | Belu ........................... | 341/87 |

FOREIGN PATENT DOCUMENTS

EP    0 467 239 A2 *    1/1992

OTHER PUBLICATIONS

Menezes et al, Handbook of Applied Cryptography, 1997, p. 323.*
Menezes et al, Handbook of Applied Cryptography, 1997, pp. 250, 347.*

* cited by examiner

*Primary Examiner*—Emmanuel L. Moise
*Assistant Examiner*—Michael Pyzocha
(74) *Attorney, Agent, or Firm*—Knobbe, Martens, Olson & Bear, LLP

(57) ABSTRACT

An anti-alteration system for Web contents is described. A public-web-server computer stores safe web files encrypted from the original web contents, including static files (such as html, text, jpg, gif, wav, mp3, asp, exe, etc.) and dynamic files (such as php, perl, java script, etc.). An original-Web-server computer stores the original web content and connects to the public-web-server computer through a protected access port such as a firewall. When a website visitor's request is received, the public web server checks the safe web file, and if the safe Web file has not been altered, the web server sends back the web content decrypted from the safe web file. A recovery module is used for encrypting the web content to the safe web file on the original web server computer.

16 Claims, 6 Drawing Sheets

ANTI-ALTERNATION SYSTEM FOR WEB-CONTENT

BACKGROUND

1. Field

The present system relates to Internet Web server computer systems. More particularly, it relates to an anti-alteration system for prohibiting illegal alteration and defacement of Web contents.

2. Description of the Related Art

The Internet-based TCP/IP protocol can provide a communication environment in which users may communicate easily with each other from anywhere on the network. There is, however, a corresponding security disadvantage.

Today's businesses rely on Web servers (HTTP servers). There are about one million new Web sites generated each month. Web sites consist of Web servers and Web contents. Web servers can store various Web contents including static files such as html, text, gif, wav, mp3, mov, jpeg, au, etc., and dynamic files such as per, php, java script, etc. The Web server will return the Web contents or the computed results when it gets a request from a Web browser. If a hacker (intruder) has invaded the Web server computer, then the Web contents may be easily altered and, subsequently, distributed when requested by a Web browser.

Since 1990, many security technologies and security products have been developed to defend against cyberattack, such as cryptograph authentication, firewall, anti-virus software, CA, VPN, intrusion detection, etc. The growth rate of Web-attack technology, however, is always ahead of existing security products. Unfortunately, current security products cannot defend against all cyberattacks and, consequently, are useless in preventing the latest wave of hacker tools and technologies.

Experts have the, "A firewall can add another layer of security to your systems, but it cannot stop a really determined cracker from penetrating your internal network." (Gary Palmer & Alex Nash, FreeBSD Handbook, ch. 8.7).

The FBI reported the results of one survey: "38% of the respondents said their Web sites have been broken into over the past year. 70% of organizations reported online graffiti, usually the simplest and least damaging type of attack. A graffiti hacker replaces the Web site's front page with his or her own text and, sometimes, offensive pictures." (FBI Survey, Apr. 7, 2002, http://bit-shield.com/webattack.html).

One anti-alteration technology called "file scanning" periodically checks all Web contents on the Web servers. This iterative technology is shown in FIG. 1:

P1→P2→P3→ . . . Pi→ . . . →Ps→ . . . ∝Pn→P1→P2→ . . .

If content has been changed without authorization, Web sites employing "file scanning" may recover the original files or stop the Web servers.

One problem with the above "file scanning" technology is that it allows the Web servers to send altered content during the time that it takes to check every file. During the comparison period, the Web servers will send altered content upon request from the Web site visitor. Thus, Web site visitors will view the altered content.

For large Web sites, it may take between ten minutes to one hour, or even more, in order to check all of the Web pages. During that time, illegally changed data may be sent to users. In other words, this technology cannot prevent 100% of the illegal alterations to Web content.

Moreover, this technology must run constantly in order to monitor the Web content, which may waste computer resources, reduce computer performance, and delay system response speed. It is not suitable for large Web sites with much content.

No current technology guarantees that the Web pages seen by visitors are the original messages sent by the Web owner. Web site owners cannot trust distribution of Web content over the Internet because there is no adequate technology to check the contents of Web sites that have been altered by hackers before that content is sent to Web site visitors.

In addition, almost all Web sites connect with a database. Hackers and Web attackers may, therefore, intrude these databases through the Web servers. Because almost all Web programs are plain text, hackers may steal information about how to access connected databases, such as IP addresses, passwords, names, etc., from Web programs such as php files and perl files, which are often stored on the Web servers.

Today's Web contents are exposed to unauthorized and illegal alteration over the Internet each day. There is no adequate protection for this content, and there is no adequate check before this content is sent to Web site visitors. This is the biggest vulnerability of distributing content over the Internet.

SUMMARY

A main object of the present system is to provide an anti-alteration system that prevents Web servers from sending any illegally changed Web content to users.

It is another object of the present system to provide an anti-alteration system that prevents hackers from invading a Web server and illegally changing Web content.

It is another object of the present system to provide an anti-alteration system that does not stop functioning when Web contents are updated or maintained.

It is another object of the present system to provide an anti-alteration system that is built at the application layer so that it is easy to transplant to different OS platforms such as Windows NT, SOLARIS, LINUX, FreeBSD, etc.

It is another object of the present system to provide an anti-alteration system that is easy to install and does not need to modify the existing Web servers or Web contents.

It is another object of the present system to provide an anti-alteration system that uses encryption employing chaos theory (for example, GCC chaos encryption) and that uses message authentication technology employing chaos theory (for example, ChaosMAM).

In order to accomplish the above objects, the present system provides an anti-alteration system for Web contents, which includes: a public-Web-server computer retaining the safe Web files encrypted from the original Web contents, including static files (such as html, text, jpg, gif, wav, mp3, asp, exe, etc.) and dynamic files (such as php, perl, java script, etc.); an original-Web-server computer which retains the original Web content and connects the public-Web-server computer through a firewall; instructions for checking and decrypting and sending the safe Web file, wherein when a Web site visitor's request is received, the public Web server checks the safe Web file, and if the safe Web file is not illegally altered, the Web server sends back the Web content decrypted from the safe Web file to the Web site visitor via http or other protocol; and a recovery instructions for encrypting the Web content to the safe Web file on the original Web server computer, wherein when the safe Web file is illegally altered and checked out by the public Web server, the altered safe Web file is automatically recovered and restored to the public Web server.

Alternatively, a second embodiment of the present system provides an anti-alteration system for Web contents, which includes: a public-Web-server computer, equipped with a prohibit illegal alteration of Web content function, retaining the Web contents that have been joined with a prohibit illegal alteration header information including a MAC (Message Authentication Code) generated for authentication checking the Web content and properties including name, size, date, and location thereof; an original-Web-server computer which retains the original Web content and connects the public-Web-server computer which is joined with the prohibit illegal alteration function, through a process for avoiding illegal access as well as a firewall; a real-time-check technique, in which, when a Web site visitor's request is received, the public Web server separates the header information from the requested safe Web file, which is joined with avoiding illegal alteration header, and at the same time using the MAC (Message Authentication Code) included in the header information to check the safe Web file by method of a message authentication technology; a separate header information wherein the Web site visitor's request is received, the real-time-check technique is used to check the safe Web file, and, when the safe-Web-file is checked as not being illegally altered, the head information from the safe Web file is cut and the remaining part is changed to the Web content which is sent back from the public Web server to the Web site visitor; and a recovery module for adding the header information to the respective Web content to make a new safe Web file on the original-Web-server computer when an illegal alteration of the safe Web file is detected, wherein a new safe Web file is sent to the public-Web-server computer to automatically recover the altered safe Web file.

Alternatively, a third embodiment of the present system provides an anti-alteration system for Web contents, which includes: a public-Web-server computer, equipped with a prohibit illegal alteration of Web content function, retaining the safe Web files that have been encrypted from the Web contents and that have been joined with a prohibit illegal alteration header information, including a MAC (Message Authentication Code) generated for authentication checking the Web content and properties including name, size, date, and location at hard disk thereof; an original-Web-server computer which retains the original Web content and connects the public-Web-server computer that have been joined with prohibit illegal alteration and decrypt functions; a real-time-check technique, wherein, when a Web site visitor's request is received, the public Web server separates a header information from the requested safe Web file, which is joined with an avoiding illegal alteration header, and at the same time uses a MAC (Message Authentication Code) included in the header information to check the safe Web file by method of a message authentication technology; and separate header information. When the Web site visitor's request is received, the real-time-check technique is used to check the safe Web file and when the safe Web file is checked as not being illegally altered, the head information is cut from the safe Web file and the remaining part is decrypted to the Web content, which is sent back from the public Web server to the Website visitor. When an illegal alteration of the safe-Web-file is detected, a recovery process encrypts the Web content and adds a header information to the Web content to make a new safe Web file on the original-Web-server computer, sending the new safe Web file to the public-Web-server computer to automatically recover the altered safe Web file.

Alternatively, a fourth embodiment of the present system provides an anti-alteration system for Web contents, which includes: a public-Web-server computer retaining the safe Web files that have been encrypted and joined with the prohibit illegal alteration header information, including a MAC (Message Authentication Code) generated for authentication checking Web contents and properties including name, size, date, location on a hard disk, etc., thereof; a CGI Gateway module for sending the request information to a CGI Gateway program, in which when the public-Web-server computer gets a request for information from the user's browser to execute a CGI (Common Gateway Interface) program, the request information is in URL format including IP address, comment, and parameters, etc., wherein the public Web server does not execute the CGI program before doing generation process, sending the request information to the CGI Gateway module for sending request information to the original Web server, in which, at the CGI Gateway module, the request information is modified to a new request that is able to be received by an original Web server automatically and such new request is sent to the original-Web-server computer. The modified request information received from the CGI Gateway module and the original-Web-server executing the CGI program in the original-Web-server computer. One embodiment includes instructions for outputting an HTTP header and the CGI contents from the CGI program which are sent from the original Web server to the CGI Gateway at the public-Web-server computer; and instructions for sending back the CGI output from the CGI Gateway module to the user's browser passing through the public Web server or directly.

A fifth embodiment of the present system is an alternative mode of the above first to fourth embodiments, wherein a chaos encryption technology (such as GCC chaos encryption) is applied to the encryption/decryption because it is faster and safer than other encryption technologies.

A sixth embodiment of the present system is an alternative mode of the above first to fourth embodiments, wherein the real-time-check technique uses a message authentication technology employing chaos theory.

DETAILED DESCRIPTION

Figure 1:
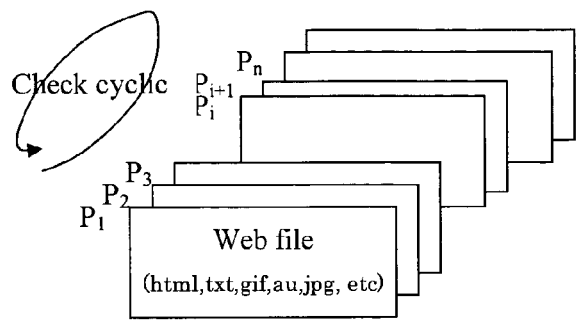
FIG. 1 is a schematic diagram illustrating an alteration check method according to a conventional technology.
Figure 2:
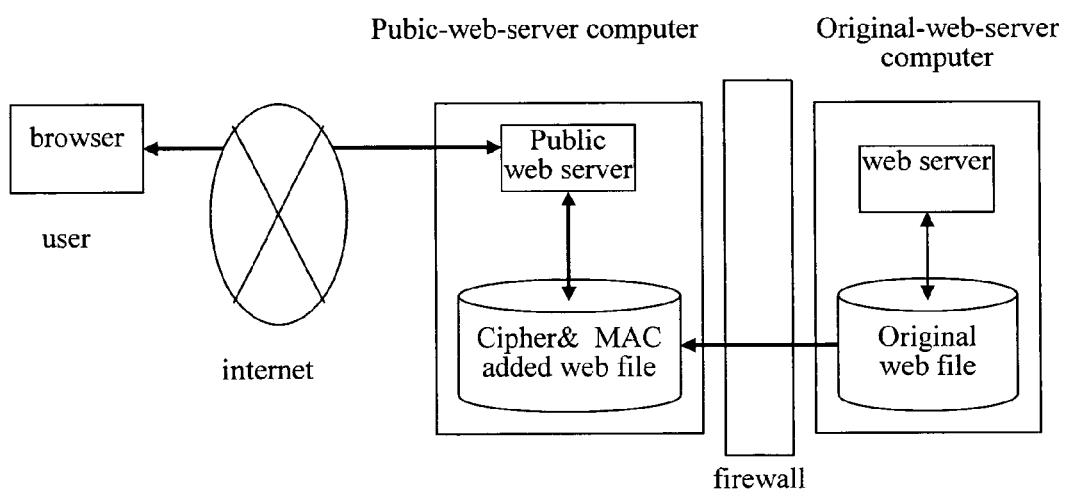
FIG. 2 is a block diagram illustrating an anti-alteration system of the present system.

FIG. 2 illustrates an overall concept of the system of the web protection system. The system performs an authentication check for all Web content on the Web site. If the authentication check detects an alteration, it stops sending the illegally changed Web content. It enables system administrators to deal with the alteration immediately as the system is equipped with instructions to inform administrators of the alteration.

In this embodiment, the encrypting Web server would not distribute any illegally altered data to Internet users (or browsers in software terms). In this embodiment, the Web contents are encrypted and joined with anti-alteration header information while being sent to users. The contents are decrypted upon receiving a page access request. Using this method, even if the system attacker alters the page data, it cannot send the altered contents to users directly. This is because the content became meaningless upon being decrypted, as the page data sent to users is decrypted. If the attacker does not alter page data in its encrypted form, the Web server cannot send any altered yet meaningful content to any users.

The Web content stored in the public Web server that is equipped with the alteration prevention function is open to the Internet users. The Web-content stored in the original Web server is kept for maintenance, administration, and/or file-backup purposes. In other words, to add or to modify a Web page, the administrator first implements the change to the Web content stored in the original Web server. After that, the change will be encrypted and transferred to the Web content in the public Web server that is equipped with the alteration prevention function. The original Web content in the original Web server cannot be opened nor accessed directly by the Internet users.

Once alteration is detected, the Web content containing the altered data can be automatically replaced with the original Web content since the system has one private original Web server and one public Web server equipped with the alteration prevention function. In other words, the original Web page can be automatically reinstated.

Authentication is a technology ensuring the completeness and correctness of information. While encryption ensures the secrecy of the information, authentication aims at ensuring that the information has not been changed. Authentication includes message authentication, user authentication, terminal authentication, time authentication, etc. Chaos MAM is a new Message Authentication Method (MAM) using Gao's Chaos Cryptosystem (GCC) (U.S. Pat. No. 5,696,826).

In other words, in dealing with the plain text message M in the original Web server, the authentication technology employed in Chaos MAM creates a MAC (Message Authentication Code) based on the plain text message M and then compares it with the MAC' created in the Web server that is equipped with the alteration prevention function. If MAC' is found to be different from MAC, the system determines that an alteration has occurred and the Web server equipped with the alteration prevent function will request M from the original Web server and replace the altered M' with M.

Figure 3:
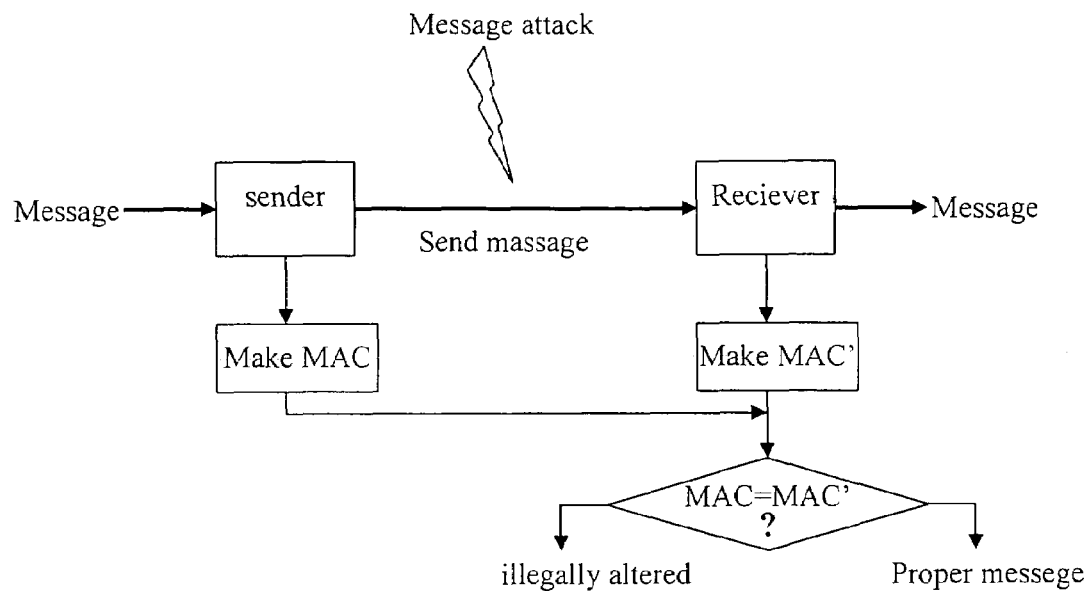
FIG. 3 is a block diagram illustrating a message authentication of the present system.

Performing message authentication can prevent this from happening. As shown in FIG. 3, in message authentication, sender creates MAC (Message Authentication Code) from the outgoing message using a crypt key and then sends both the message and MAC. The receiver receives message M', which may not be identical to message M due to potential alteration en route, creates MAC' from the message M' using a same crypt key (may need to use public key technology to send the crypt key from sender to receiver), and compares MAC with MAC'. If they are the same, the message is authentic; otherwise the message was altered.

Figure 4:
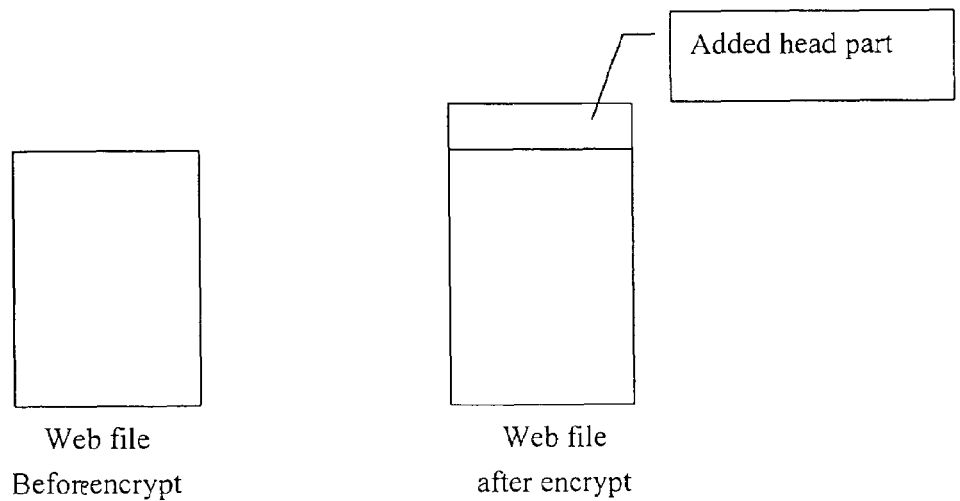
FIG. 4 is a Schematic diagram illustrating a structure of a safe file of the present system.

FIG. 4 shows the construction of the safe Web file of one embodiment. Header information like MAC, size, dates, properties, and addresses of the file are stored in the Web content. In other embodiments, the system can also be built, in principle, with various other encryption systems and message authentication technologies, though the system based on GCC and the authentication technologies using GCC is the most superior from the perspective of processing speed.

An actual example of using MAC is explained. Then, an example of correcting altered Web content and sending it to users in real-time is explained.

A real-time module provides authentication of content in response to user requests. It is well known that the primary function of the Web server is to send requested Web contents to clients (or browsers). In most cases, the requested Web content is stored in a hard disk and can be easily accessed from a server. The Web server seeks out the file based on the request and transfers its content to the address of the client system that made the request via http protocol.

Figure 5:
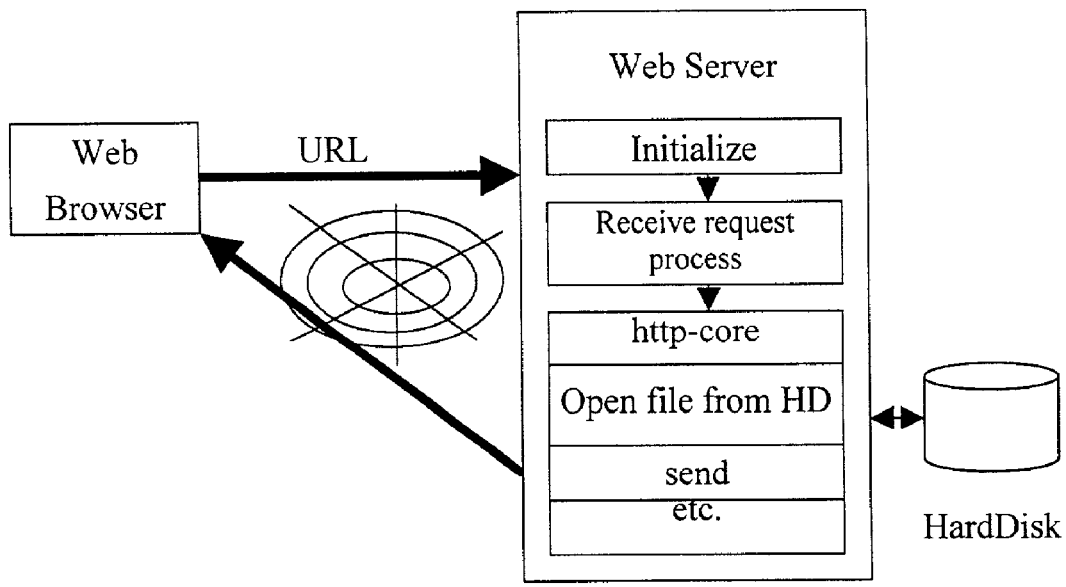
FIG. 5 is a block diagram illustrating a structure of a usual Web server.

FIG. 5 shows the principles of a regular Web server:
(1) An initiation process such as inputting environmental parameters.
(2) Receiving request in URL format from Web browsers using http protocol.
(3) Reading requested file from hard disk after necessary processing work.
(4) Sending to Web browser the contents of the requested file.

Figure 6:
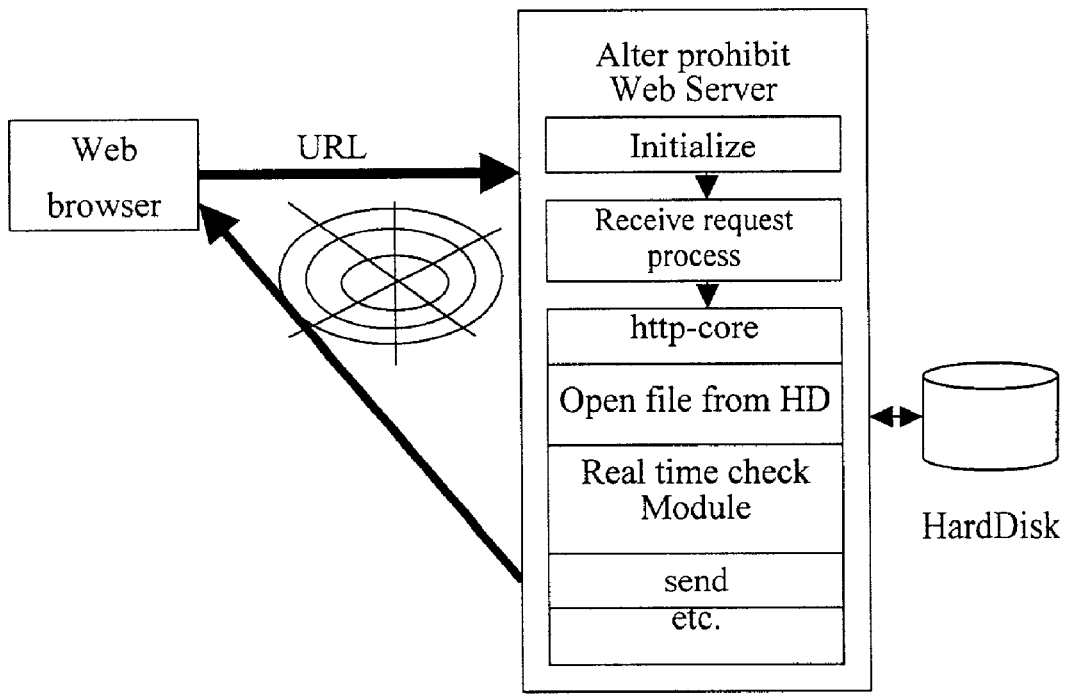
FIG. 6 is a block diagram illustrating a structure of a Web server in a public-Web-server computer equipped with a real-time-check module of the present system.

The Web server, as shown in FIG. 6, is the engine of the anti-alteration system. It inserts the real_time_check module between the Openfile module and the send module. The Openfile module reads the Web content referred to above from a hard disk and writes it into computer memory.

Figure 7:
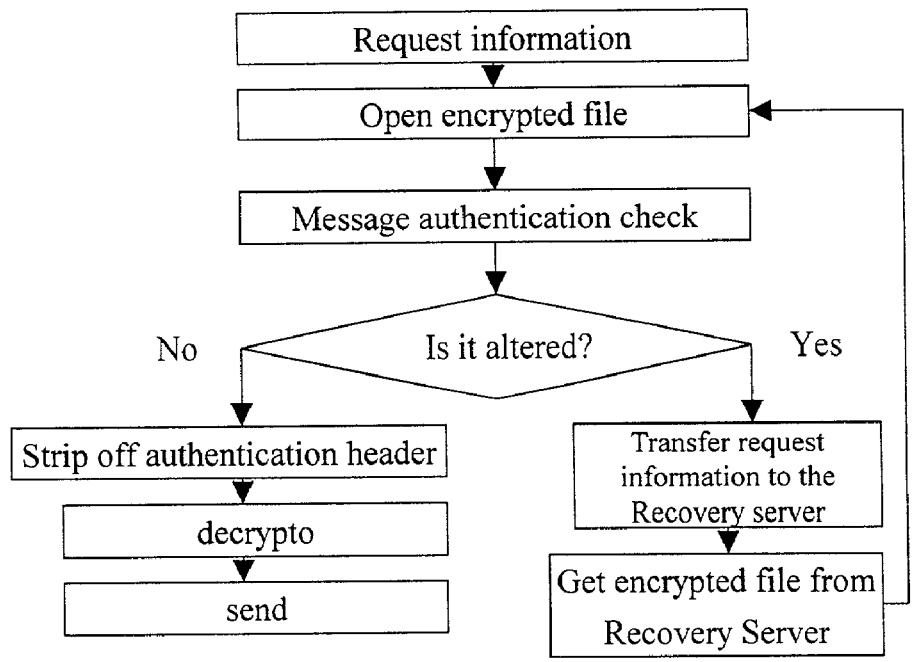
FIG. 7 is a block diagram illustrating principles of a real-time-check module of the present system.

FIG. 7 shows the principle of the real_time_check module. Based upon the requested information, the module first inputs a file attached in the alteration prevention header into memory. The header consists of a MAC (Message Authentication Code) generated for authentication checking Web content and properties including name, size, date, location at hard disk, etc thereof.

Whether a file has been altered is checked by the Message Authentication Technology. If the file is not altered, the portion containing alteration prevention header is dropped, the file is decrypted, and it is then sent to the Web browser. If a file is found to have been altered, in this embodiment, a "recovery message" is sent at once to the recovery server in the original Web server. After receiving the recovery message, in this embodiment, the following steps are taken to recover the file altered:
(1) The recovery server finds out the original file from original-Web-server under the recovery message;
(2) Creates a MAC using the Message Authentication Technology;
(3) Makes an "alteration prevention header" from the MAC, and the properties of the file such as size, date, time, directory, etc.;
(4) Encrypts the file;
(5) Adds the "alteration prevention header" to the file to make a "safe-Web-file"; and
(6) Sends this new safe-Web-file to the public-Web-server.

(7) The public-Web-server deletes the altered file and saves this new file to the same location on a hard disk hard disk provided to the public-Web-server.

As a result, the altered file stored in the public Web server can be recovered. In this embodiment, altered files will never be sent to any Web clients because all Web content will be inspected by message authentication checking before being sent out.

The system provides a "real-time check" capability. Significantly, with respect to the additional burden on the CPU of a computer, this system is much smaller than the current "file scanning" technology. Unlike the "file scanning" technology, this system does not need to repeatedly scan and check entire files in the Web server, but only checks a file when the file is requested by a visitor.

To realize the practical real-time-check technology, however, high-speed and high-strength encryption and authentication check technology is necessary. The present system achieves the highest level of Web content alteration prevention by incorporating GCC (Gao's Chaos Cryptosystem) cipher and chaos MAM technologies known for their high processing speed.

In view of the above, the real-time check technology is a very effective technology for handling execution files at the browser side and for various Web content containing pictures, sounds, extensions like HTML, html, Text, GIF, JPEG, au, etc.

In dealing with CGI files, however, other methods have to be considered. The CGI (Common Gateway Interface) is a program that is executable through a Web server. It is also called the CGI script or the CGI file. The CGI is a gateway interface independent of language and can be implemented using any application development language such as C, C++, Perl, and even JAVA.

The CGI program was developed for Web server administrators, and its expert users, to add special features/functions. The usage varies. For example, it can take DATA from a database server in another computer, compile it (or summarize it, statistically analyze it, graphically construct it, etc.), and then send the results out. It can handle more complicated tasks. The CGI program can execute executable files like OpenText, and send the results to browsers.

The execution of the CGI program includes the following: responding to the request in the form of a URL from a client; executing the program in the Web server environment; and sending the results to the browser used by the client.

Figure 8:
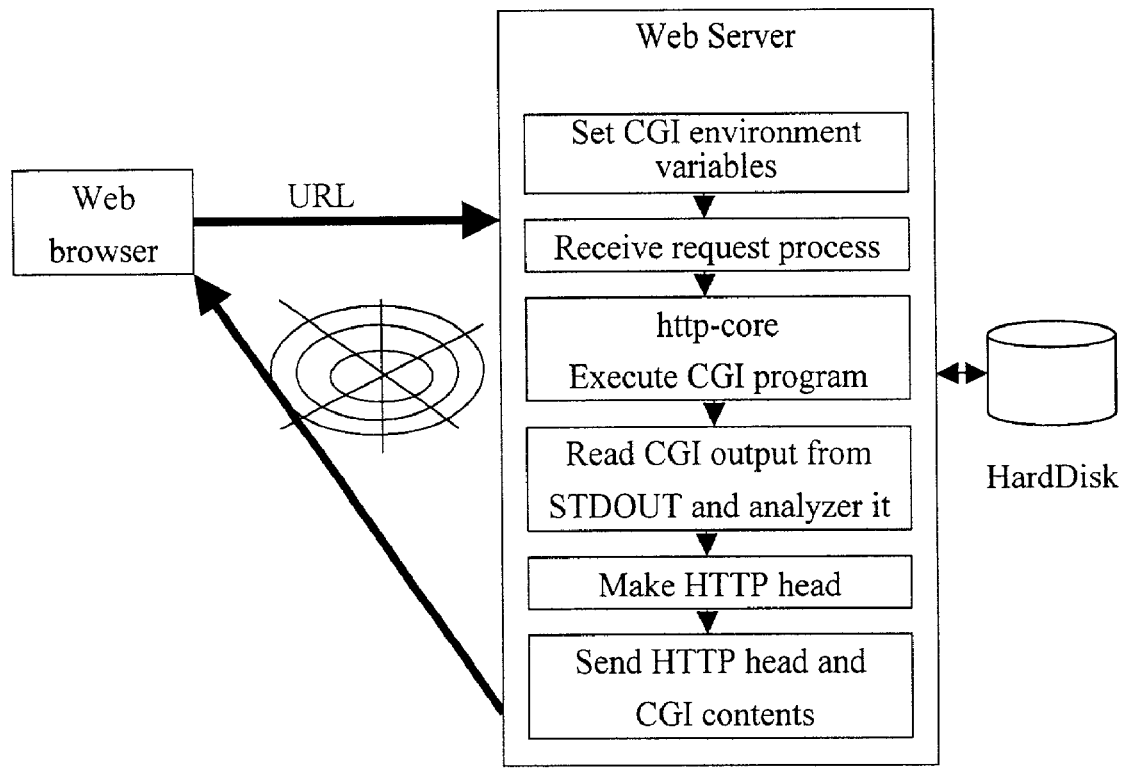
FIG. 8 is a block diagram illustrating usual execution principles of a CGI program.

As shown in FIG. 8, the flow includes the following steps:
(1) Set environment parameters for the CGI program. Set the parameter name of the HTTP request method as REQUEST METHOD, and set the data taken from client as QUERY STRING.
(2) Execute the requested CGI program using request information received from the user.
(3) Wait for the completion of the CGI program, read the output from STDOUT, analyze it, and stop the Content-Type.
(4) Create the necessary HTTP header.
(5) Send the header and the output of the CGI program to the client who made the request.

The Web content anti-alteration system described in the embodiment of the present system is constructed from a public Web server and an original Web server. The original Web server stores non-executable files like HTML, TEXT, GIF, JPEG, and CGI files. Although the original Web server can be run as a usual Web site, the system of the described embodiment uses it as the storage location for original files only.

The non-executable files placed on the public-Web-server computer are enciphered and joined with a MAC. We can prevent alteration to the Web site by using real-time-check technology on the Web server. It is different, however, for the CGI programs. Execution of the CGI programs is dependent on the execution environments of the original-Web-server computer, such as the OS, IP address, directory structure, and so on. When they are moved to the public Web server from the original Web server, the execution environments (such as IP address, directory, etc.) will be changed, and, in many cases, they cannot be executed. As such, the following embodiment solves the problem associated with the CGI programs.

This embodiment uses a usual Web server (for example, Apache, Netscape, etc.) for the original Web site, and uses original Web content such as HTML file, and GIF and the CGI files that reside in it. In the public-Web-server computer, there is a Web server modified so as not to directly execute the CGI program. To this, the CGI Gateway module is added. The CGI files are not placed in the public-Web-server computer.

Figure 9:
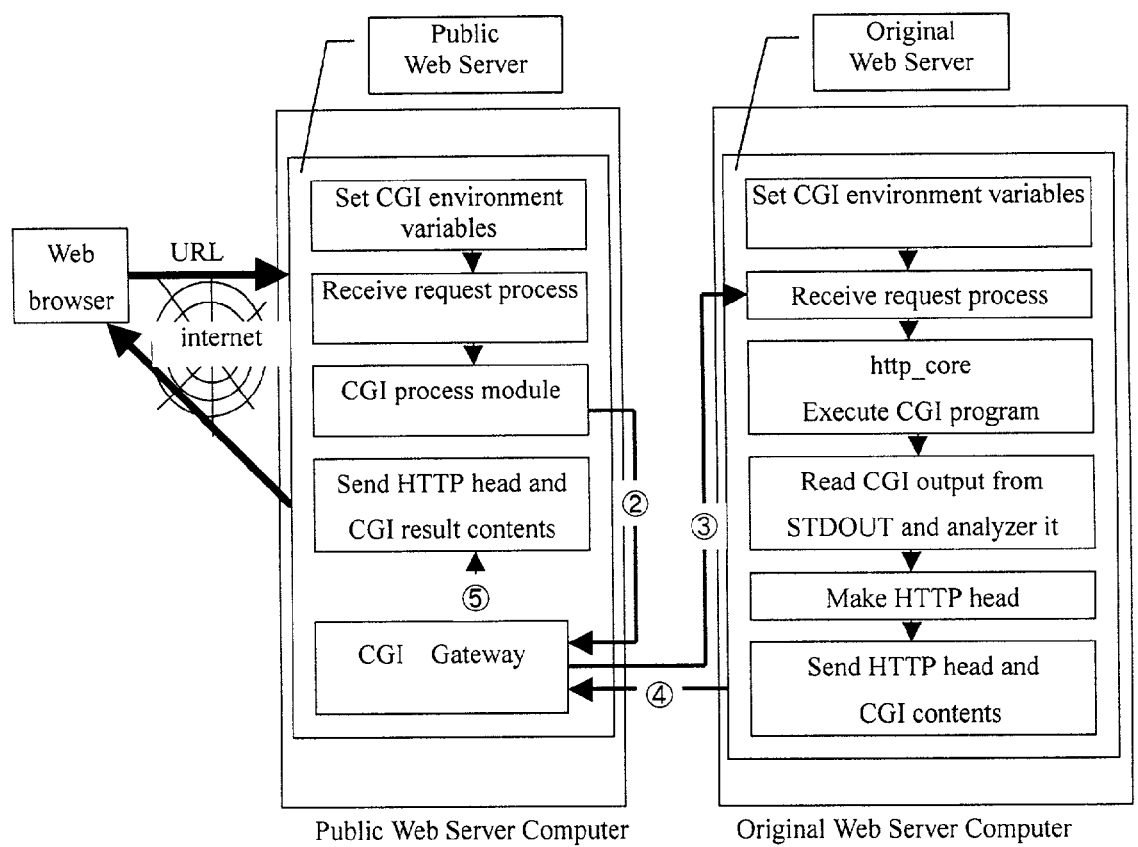
FIG. 9 is a block diagram illustrating principles of alteration prevention of the CGI programs of the present system.

Referring to FIG. 9, the process flow of the CGI in this embodiment is illustrated as follows:
(1) In the public-Web-server computer, environment variables for the CGI programs are set up. The request method name of HTTP to REQUEST METHOD environment variable and the set data received from client to QUERY STRING environment variable are set up.
(2) Pass the request information of the CGI program (IP address, comments, parameters, etc) received from browser to the CGI Gateway module.
(3) In the CGI Gateway module, modify the received request information to be acceptable by the original Web site, then send the new request to execute the CGI file on the original Web server.
(4) In the original Web server, execute the requested the CGI program on original computer as usual.
(5) Send http header and output of the CGI program to the CGI Gateway module on public Web server.
(6) In the CGI Gateway module, send output of the CGI program to browser through the public Web server or directly.

An example of implementation of this embodiment using GCC Chaotic Encryption System and Chaos MAM chaotic authentication technology is disclosed as follows.

First, the Chaotic Encryption System is briefly explained. One can use either the Public-key encryption system or Symmetric-key encryption system in Chaotic Encryption System. Symmetric-key encryption system will be used for explanation here. In the present system, there is no need to give the key to the user, so the Symmetric-key encryption system will be sufficient. Assume plain text P, chaotic cipher function G, ciphered text C, and cipher key K. It can encipher as $$C=G(K,P)$$

To decipher the ciphered text C, using reverse function G−1 and key K, we can decipher as $$P=G-1(K,C)$$

In Chaotic Encryption System, one can use arbitrary length of plain text P. The length of key K is variable, ranging from 8 bits to 2048 bits, with no effect to speed.

This embodiment consists, at least, of the following parts or components:
(1) Public Web server
(2) Encoder/Decoder module
(3) Recovery server and Recovery client
(4) Alarm system
(5) Administration system
(6) Original Web server
(7) Firewall With regard to the first three components:
(1) The public Web server includes decoder functions in addition to the functions of various usual Web servers (for example Apache Web server).
(2) In the Encoder/Decoder module, the encoder part does encryption, generation of MAC, addition of header information, etc. in order to make a safe Web file; and the decoder part does authentication check, decryption, subtraction of header information, etc in order to make original Web content from the safe Web file.
(3) The recovery server includes the encoder function.

Figure 10:
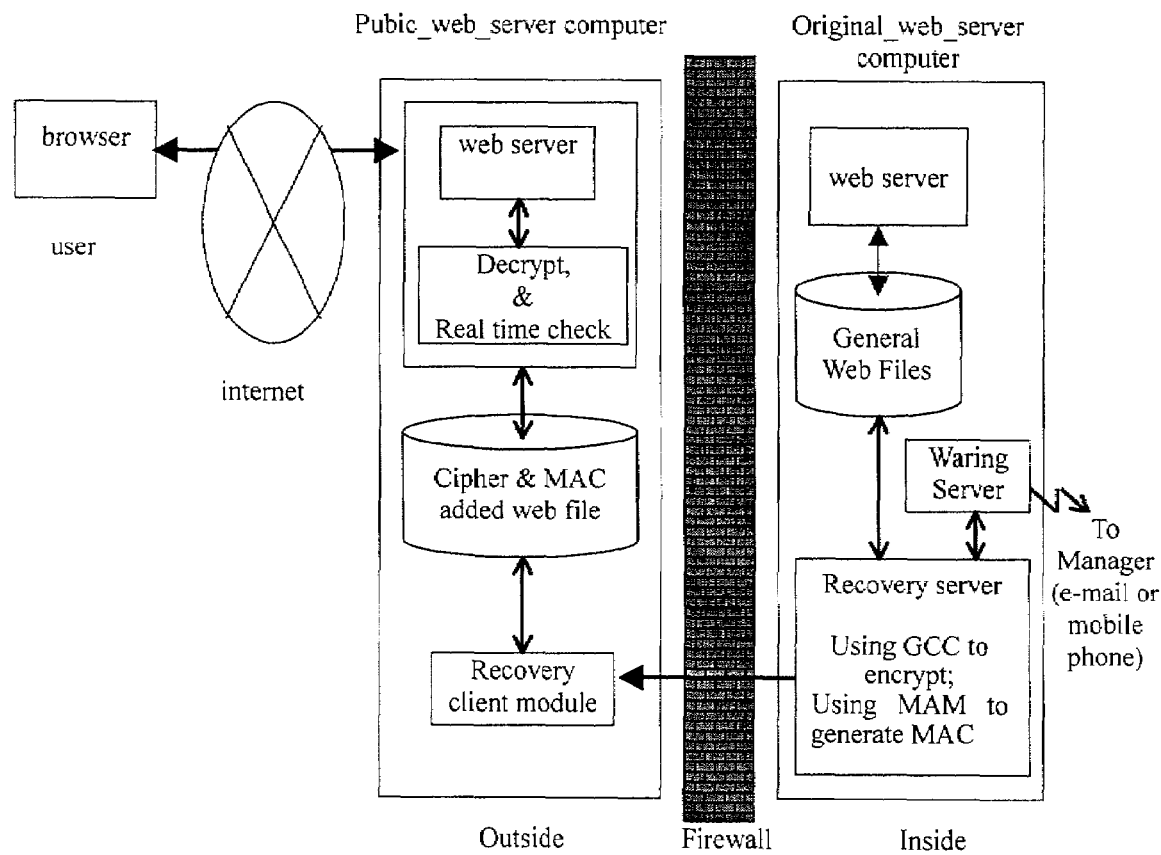
FIG. 10 is a block diagram illustrating a system configuration of the anti-alteration system using GCC (Gao's Chaos Cryptosystem) chaos encryption and chaos MAM (Message Authentication Method) technology in an implementation embodied in the present system.

In FIG. 10, a conceptual system configuration of an embodiment of the present system is illustrated.

This embodiment consists of two Web server computers. Two computers are connected with a communication cable through a firewall. One Web server computer is for the public Web server and the second is for the original Web server. Each computer consists of some hardware components such as CPU, memory, bus (Front Side Bus, PCI, etc), hard disk, motherboard or SBC, etc. Each computer should have at least two NICs (Network Interface Cards). At least one NIC should be Ethernet that supports TCP/IP protocol for communication. The present embodiment is able to make each computer and the firewall into one chassis or two or more separate chassis to fit the needs of various Web sites. Additionally, each computer should install OS (Linux, Solaris, Windows, etc.) software and ether software, such as Web server (Apache, IIS, etc.). Original Web-contents are stored in the original-Web-server computer. The Recovery Server, the Alarm System and the Administration System are also deployed in this computer. If any new Web content is found, or Web-content is updated, or there is a "recovery message," the Recovery Server will automatically call the encoder to make a "safe Web file" from the Web content. Then the Recovery Server can send the "safe Web file" to the public-Web-server computer at once.

In the public-Web-server computer, Recovery client puts the received "safe Web file" in the place indicated by the Recovery server. When issued a request for Web content from a Web site visitor, the public Web server with alter prevention function will:
(1) Read MAC, etc., information from header part of encoded Web contents, and
(2) Call decoder operation such that it does authentication check for the Web content.

If the authentication check passes, the public Web server strips off the header part from the files and decrypts them. Then the public Web server sends the files back to the Web site visitor via http protocol, or https protocol, or other protocol if need. The visitor will view the Web page with Web browser software installed in the visitor's computer.

If an alteration is discovered at the authentication check, the public Web server will do recovery actions, including sending a recovery message to the Recovery Server through the Recovery Client. The Recovery Server locates the specified Web content from the original Web sever, encodes it, and sends it back to the public Web server. At the same time, it informs the Alarm System, and the Alarm System can send an alarm message to the Web system administrator by email or by phone.

The following are merits of the present system.
(1) There is no CGI file in the public-Web-server computer. So, even if a hacker invades this public-Web-server, the hacker cannot alter the CGI file or execute another CGI file. (Additionally, a hacker cannot invade the original-Web-server computer because the original-Web-server computer is not open to public users; there is a firewall between the public-Web-server computer and the original-Web-server computer. So, it is considered that the CGI file in the original-Web-server computer is safe.)
(2) The CGI programs can execute in the original-Web-server computer within current environments. For developers of Web sites, installation, daily update, and maintenance of the Web content alteration prevention system is very easy because developers can use the current operations to update Web contents.
(3) The current way may be used to issue the request for execution of the CGI program to the public Web site as a public user who accesses the home page of the Web site.
(4) Various CGI programs in C, C++, Perl, Java, etc. computer languages can be used.

The present system realizes the technology of Web real-time check. With respect to speed, the authentication check and decipher will be done instantaneously, at the moment request is received from the Web browser, so the response time is almost the same as the case without the check system. With respect to safety, the system never sends altered Web contents.

The present system is best for large Web site systems. (1) It does not increase the workload of the system because traffic will not increase. (2) Even if the scale (number of files) of Web content increased, the present system will not influence the check time and recovery speed.

The system of the present system does not affect the visitor's browser. Web site visitors can use their current browsers to visit Web sites built according to the present system, and do not need to download new client software. The system of the present system has dynamic recovery function. If it finds an alteration, it will replace the altered content automatically with the original Web content. Moreover, the system can set up an automatic alarm system. If an alteration is found, it will automatically send an alert message to the Web administrator by email or by phone. The system is easy to install and not affected by updates to the Web contents.

With this system, Web masters or Web designers can use their accustomed Web editor tools such as FrontPage, WebEditor, etc., to design, develop, modify, and update the Web contents continually. They do not need to change their current work environment. Also, they do not need to know how to encipher their Web content because the present system does those jobs automatically.

With the system of the present system, the Web server will always send clear and trusted Web pages to Web site visitors. There will be no defacements and no Web viruses/worms. The published Web contents will always be the original messages of the Web owners. It will protect the Web owners' Internet business. With this system, defacement is detected before defaced information is sent to a user. Visitors will never see the Web pages defaced at any time. The system can prevent completely the defacing, deleting, and replacing of Web contents. With the system, hackers cannot insert any malicious code to Web contents. The present system can prevent theft of confidential Web contents from Web servers. It can also prevent hackers from spreading malicious code from their Web sites.

The system provides "Fault-Tolerant" functions to Web servers in a manner that is faster than the prior art. If Web contents on the public Web server have any "Fault," the present system can recover automatically. The Web server will not be "broken off." In other words, the present system can increase the reliability of Web sites to prevent Web attacks. It can especially prevent unknown Web attacks because the web content is protect from hacker attacks.

Using Chaotic Encryption System and Chaos MAM authentication technology, the following excellent results can be achieved:

High safety;
High-speed processing;
Best for multimedia data such as graph, music, text, move, html and so on;
Light CPU workload for the public server system; and
No changes to browser software.

Although various embodiment have been described, the system is not limited to only the disclosed embodiments. Thus, the system is limited only by the claims.

What is claimed is:

1. An anti-alteration system for web-content, comprising:
   a public-web-server configured to store safe-web-files encrypted from original web-content including one or more types of static files and one or more types of dynamic files, and configured to provide HTTP web server functions;
   a private-web-server configured to store said original web-content, said private-web-server provided to said public-web-server through a firewall, said firewall configured to block all Internet communication such that files in said private web server cannot be accessed from the Internet, rather, said firewall configured to pass recovery requests from said public-web-server to said private-web server;
   wherein when a web visitor's request is received, said public-web-server is configured to verify that said safe-web-file has not been improperly altered, deleted or replaced, said public-web-server further configured to decrypt one or more of said safe-web-files and respond to said visitor; and
   said public-web-server further configured to automatically send a recovery request to said private-web-server when said public-web-server detects an unauthorized alteration of said safe-web-files, said private-web-server, in response to said recovery request, configured to create new safe-web-files by encrypting one or more files of said original-web-content and send said new safe-web-files to said public server through said firewall.

2. The anti-alteration system, as recited in claim 1, wherein said encryption comprises chaos encryption technology to do encryption and decryption of said web-content for increasing the web server response speed and increasing security strong of whole system.

3. The anti-alteration system, as recited in claim 1, further comprising a real-time-check module used on said public-web-server computer for linking to a decryption module, wherein said decryption module is configured to decrypt one or more of said safe-web-files in response to an HTTP request received from said web visitor.

4. The anti-alteration system as recited in claim 3, further comprising a real-time-check module configured to use symmetric-key encryption to decrypt one or more of said safe-web-files when said web visitor's request is received.

5. The anti-alteration system, as recited in claim 4, wherein said symmetric-key encryption is selected from a group consisting essentially of DES, 3DES and AES.

6. An anti-alteration system for web-content, comprising:
   a public-web-server configured to store safe-web-contents that have been provided with header information including a MAC (Message Authentication Code) generated from said original web-content, and properties of said original-web-content including, name, size, date, and location thereof;
   a private-web-server configured to store said original web-content said public-web-server provided to said private-web-server through a firewall, said firewall configured to pass recovery requests from said public-web-server to said private-web server, said firewall configured to block other communication from the public-web-server to the private-web-server such that web content files in said private web server cannot be accessed from the Internet;
   said private-web-server configured to separate said header information from a requested safe-web-file, and using said MAC (Message Authentication Code) included in said header information to check an authenticity of said safe-web-file; and
   said public-web-server configured to add new header information to said original web-content to create a new safe-web-file on said private-web-server computer when an unauthorized alteration of said safe-web-file is detected, wherein said new safe-web-file is sent to said public-web-server computer to automatically restore said altered safe-web-file.

7. The anti-alteration system, as recited in claim 6, further comprising a real-time-check module used on said public-web-server computer for linking to an authentication module, wherein said authentication module is configured to provide authentication of said safe-web-file in response to a request received from said web visitor though http protocol.

8. The anti-alteration system, as recited in claim 7, wherein said real-time-check module uses a message authentication technology using chaos theory to check whether the safe-web-content has been altered.

9. The anti-alteration system, as recited in claim 6, wherein said real-time-check module that is configured to link said public-web-server services by using at least one message authentication technology selected from a group consisting essentially of MD4, MD5, and SHA.

10. An anti-alteration system for web-content, comprising:
    a public-web-server computer, configured to store safe-web-files which have been encrypted from original web-contents and have been provided with header information, said header information including a MAC (Message Authentication Code) generated from authentication checking said original web-content and properties including name, size, date, and storage location thereof;
    a private-web-server computer which retains said original web-content and which is provided to said public-web-server computer through a firewall;
    a real-time-check module, in response to a web visitor's request safe-web file, said real-time-check module configured to separate said header information from said safe-web-file and using a MAC (Message Authentication Code) included in said header information to authenticate said safe-web-file by comparing said header information with;
    separate header information; and
    a recovery module, when an unauthorized alteration of said safe-web-file is detected, said recovery module configured to encrypt said original web-content and add header information to said original web-content to create a new safe-web-file on said private-web-server computer, sending said new safe-web-file to said public-web-server computer to automatically restore said safe-web-file which has been altered, said private-web-server protected by a firewall module configured to pass recovery requests from said public-web-server to said private-web server, said firewall module configured to block other communication from the public-web-server to the private-web-server such that files in said private web server cannot be accessed from the Internet.

11. The anti-alteration system, as recited in claim 10, wherein said recovery module uses chaos encryption technology to do encryption and decryption.

12. The anti-alteration system, as recited in claim 11, wherein said real-time-check is configured to use a symmetric-key encryption to decrypt said safe-web-contents in response to said web visitor's request.

13. The anti-alteration system, recited in claim 12, wherein said symmetric-key encryption is selected from a group consisting essentially of DES, 3DES, RC4 and AES.

14. The anti-alteration system, as recited in claim 10, wherein said real-time-check module is configured to provide authentication of said safe-web-file in response to a request received from said web visitor through http protocol.

15. The anti-alteration system, as recited in claim 14, wherein said real-time-check module uses a message authentication technology using chaos theory to check whether the safe-web-content has been altered.

16. The anti-alteration system, as recited in claim 14, wherein said real-time-check module uses at least one of MD4, MD5, and SHA for message authentication.

* * * * *